United States Patent
Chung et al.

(10) Patent No.: US 6,487,203 B1
(45) Date of Patent: Nov. 26, 2002

(54) APPARATUS FOR TRANSMITTING CELLS BETWEEN ATM LAYER AND PHYSICAL LAYER AND METHOD THEREFOR

(75) Inventors: Nae-Ho Chung, Seoul (KR); Seung-Yeop Yang, Kyonggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/274,779

(22) Filed: Mar. 24, 1999

(30) Foreign Application Priority Data

Mar. 24, 1998 (KR) .............................. 98-10129

(51) Int. Cl.[7] .................. H04L 12/50; H04L 12/28; H04L 12/56; H04J 3/16; H04J 3/22
(52) U.S. Cl. .................. 370/395; 370/359; 370/419; 370/469
(58) Field of Search ................ 370/393, 395, 370/401, 402, 432, 398, 399, 409, 412, 473, 475, 229, 230, 232, 234, 366

(56) References Cited

U.S. PATENT DOCUMENTS

| | | | | |
|---|---|---|---|---|
| 5,485,456 A | * | 1/1996 | Shtayer et al. | 370/395 |
| 5,748,631 A | | 5/1998 | Bergantino et al. | |
| 5,784,370 A | * | 7/1998 | Rich | 370/395 |
| 5,852,606 A | | 12/1998 | Prince et al. | |
| 5,889,778 A | * | 3/1999 | Huscroft et al. | 370/395 |
| 5,978,377 A | * | 11/1999 | Kim et al. | 370/397 |
| 6,075,786 A | * | 6/2000 | Kunito | 370/389 |
| 6,243,382 B1 | * | 6/2001 | O'Neill et al. | 370/395 |
| 6,266,324 B1 | * | 7/2001 | Kirino et al. | 370/230 |
| 6,266,748 B1 | * | 7/2001 | Bishop | 711/158 |
| 6,269,096 B1 | * | 7/2001 | Hann et al. | 370/366 |
| 6,307,858 B1 | * | 10/2001 | Mizukoshi et al. | 370/395 |

* cited by examiner

Primary Examiner—Wellington Chin
Assistant Examiner—M. Phan
(74) Attorney, Agent, or Firm—Robert E. Bushnell, Esq.

(57) ABSTRACT

A method of transmitting a cell between the ATM layer and the physical layer is provided for the ATM matching system, which includes the physical layer divided into a specified number of uniform physical device groups multiplexly polled by the ATM layer. The method comprises the steps of multiplexly polling the physical device groups by the ATM layer, transmitting an enable signal to the polled device upon receipt of a state signal from the physical layer, transmitting the cell to the physical layer, checking the multiplexed polling of the ATM layer by the physical layer, writing a physical port number into the cell with transmitting a state signal to the ATM layer upon receipt of the multiplexed polling, and transmitting the cell to the ATM layer upon receipt of an enable signal from the ATM layer.

6 Claims, 4 Drawing Sheets

APPARATUS FOR TRANSMITTING CELLS BETWEEN ATM LAYER AND PHYSICAL LAYER AND METHOD THEREFOR

CLAIM OF PRIORITY

This application makes reference to, incorporates the same herein, and claims all benefits accruing under 35 U.S.C. §119 from an application entitled Apparatus For Transmitting Cells Between ATM Layer And Physical Layer And Method Thereof earlier filed in the Korean Industrial Property Office on Mar. 24, 1998, and there duly assigned Serial No. 98-10129 by that Office.

BACKGROUND OF THE INVENTION

1. Field of the Invention

The present invention relates to an apparatus for transmitting cells between the ATM (Asynchronous Transfer Mode) layer and the physical layer in the ATM protocol, and a method therefor.

2. Description of the Related Art

Generally, the ATM protocol structure is defined by extending the conventional N-ISDN (Narrowband Integrated Services Digital Network) protocol structure according to the OSI (Open Systems Interconnection) layer model. Each layer provides inherent functional services with the help of the next lower layer's services. The ATM protocol structure fundamentally consists of physical layer, ATM layer, ATM adaptation layer (AAL), and higher layer. See U.S. Pat. No. 5,852,606 to Jeff Prince et al. entitled Method And Apparatus For Transmitting Cells Across An ATM Switch Bus, incorporated herein by reference.

The physical layer further includes physical medium sublayer (PM) and transmission convergence sublayer (TC), providing the transmission resources for carrying ATM cells. The ATM layer provides the ATM communication regardless of transmission system, performing multiple partitioning of cells, selection of a virtual channel and path and generation and deletion of cell headers. The AAL divides information into uniform lengths adapted to construct cells between the ATM layer and higher layer. In this case, it also serves to absorb the accompanying quantization effect, compensate for cell losses and errors due to transmission error or excess, and shield the inherent operation of the ATM layer from the higher layer.

The cell format between the low speed ATM board assembly (LSAA) and low speed physical layer board assembly (LSPA) of the presently developed ATM ESS switch matching has a dummy header of 3 bytes. Namely, the cell transmission system between the ATM layer and physical layer in the conventional low speed subscriber's board employs a proprietary cell format as shown in FIG. 1. This conventional cell format consists of a proprietary dummy header of 3 bytes, a header field of 5 bytes, and an information field of 48 bytes. The header field and information field as defined in the standard cell includes generic flow control (GFC) region, virtual path identifier (VPI) region, virtual channel identifier (VCI) region, payload type (PT) region, header error control (HEC) region, and cell loss priority (CLP) region. Namely, the above cell format has the proprietary field of 3 bytes compared to the cell format proposed by the ATM forum.

In addition, the procedure for transmitting a cell from LSAA to LSPA is the kind of broadcast employing the multiplexer, which requires each board to check the board bit map of 16 bits to determine whether the received cell belongs to itself, and to transmit the cell through the corresponding port determined by checking the link number if it belongs to the board. On the contrary, the procedure for transmitting a cell from LSPA to LSAA is the kind of direct status that the cell is transmitted in response to an enable signal after the Clav (Cell Available) signal is transmitted to the ATM layer with a header of 3 bytes attached to the cell of 53 bytes. Hence, such system suffers the following drawbacks:

First, the proprietary cell format not defined by the ATM forum makes it impossible to use commercially available parts, and difficult to export the technological product. In addition, there must be used the complex cell format with a large overhead. Second, the cell transmission is carried out by a hybrid procedure which consists of the broadcast method employing the multiplexer (MUX) from LSAA to LSPA and the direct status indication method from LSPA to LSAA.

Besides, the multiplexing polling of the UTOPIA (Universal Test and Operation Physical Interface for ATM) level 2 is based on 31 ports, which are divided into eight (8) groups respectively polled. This is not suitable for the matching module supporting 64 ports.

An example of another method and apparatus for processing cells in an ATM communication system is provided by U.S. Pat. No. 5,748,631 to Paul V. Bergantino et al. entitled Asynchronous Transfer Mode Cell Processing System With Multiple Cell Source Multiplexing.

SUMMARY OF THE INVENTION

It is an object of the present invention to provide an apparatus and a method for transmitting cells between the ATM layer and physical layer by employing the standard cell format.

It is another object of the present invention to provide an apparatus and a method for transmitting cells between the ATM layer and physical layer, where the physical layer is divided into uniform groups multiplexly polled by the ATM layer.

It is still another object of the present invention to provide an apparatus and a method for transmitting cells between the ATM protocol layers according to the ATM standard.

According to the present invention, a method of transmitting a cell between the ATM layer and the physical layer is provided for the ATM matching system, which includes the physical layer divided into a specified number of uniform physical device groups multiplexly polled by the ATM layer. The method comprises the steps of multiplexly polling the physical device groups by the ATM layer, transmitting an enable signal to the polled device upon receipt of a state signal from the physical layer, transmitting the cell to the physical layer, checking the multiplexed polling of the ATM layer by the physical layer, writing a physical port number into the cell with transmitting a state signal to the ATM layer upon receipt of the multiplexed polling, and transmitting the cell to the ATM layer upon receipt of an enable signal from the ATM layer.

The present invention will now be described more specifically with reference to the drawings attached only by of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
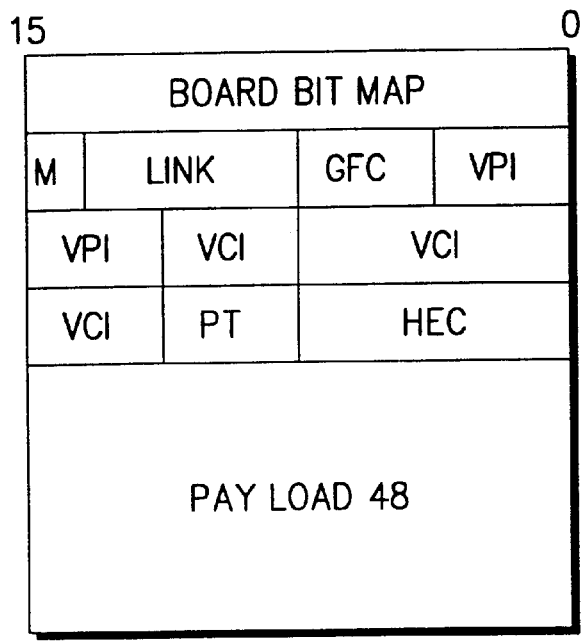
FIG. 1 is an ATM cell format according to prior art.
Figure 2:
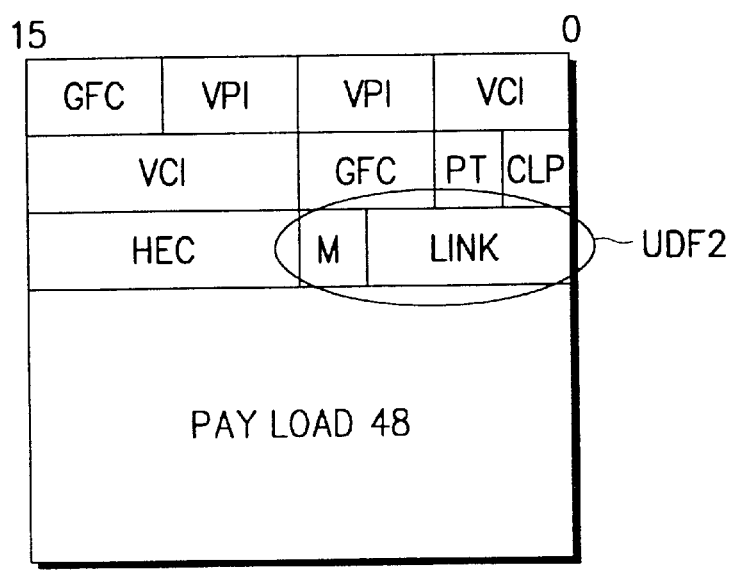
FIG. 2 is an ATM cell format according to the present invention.

Referring to FIG. 2, the inventive cell format, as defined in the standard cell format, includes the regions of GFC, VPI, VCI, PT, CLP, HEC, and the user defined field UDF2 of 1 byte. Namely, as shown in FIG. 2, the cell format includes a header constructed according to the cell format proposed by the ATM forum, and employs the empty UDF2, to achieve the cell transmission system more similar to the standard protocol.

Figure 3:
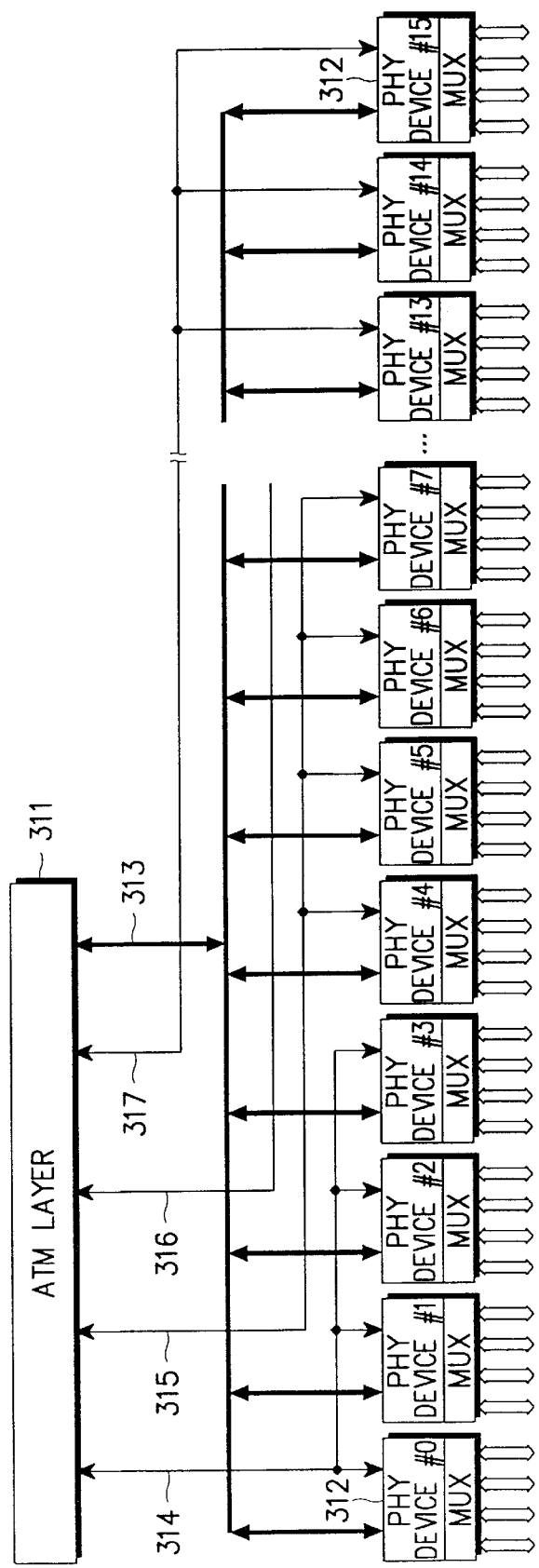
FIG. 3 is a block diagram for illustrating the inventive apparatus for transmitting cells between the physical layer and ATM layer according to the present invention.

Describing an apparatus for transmitting cells between the ATM layer and physical layer by using multiplexed polling in reference to FIG. 3, four Clav signal lines (314, 315, 316 and 317) and a data line 313 are provided for communication between the ATM layer 311 and the physical layer 312. In the present embodiment, the physical layer consists of 16 physical devices. The 0th Clav signal line Tx/Rx Clav 0 314 is connected with the 0th to third physical devices (312 #0 through 312 #3), the first Clav signal line Tx/Rx Clav 1 315 with the fourth to seventh physical devices (312 #4 through 312 #7), and so on. Namely, each of the Clav signal lines is connected with four physical devices while the single data line is connected with all the physical devices. The signals for the transmission of cells between the ATM layer and physical layer are transmitted through the Clav signal lines while the substantial cell data, SOC (start of cell) data, and the address data to poll the physical devices are transmitted through the data line.

In addition, it is assumed that the ATM layer is connected with 64 physical ports, as shown in FIG. 3, by way of the 16 physical devices of the physical layer 312. The multiplexed polling system of the UTOPIA level 2 designates group addresses according to the physical port designation table in order to poll eight groups. In this case, each group is designated by using the three most significant bits (MSB's) among the 5 bits of the group address Line. The inventive apparatus however, only uses the two MSB's of the address line to poll 16 boards (physical devices) divided into 4 groups. An example of the physical device designation table is shown in Table 1.

TABLE 1

| PHY Device Address | Group Number | Address [4:0] |
|---|---|---|
| 0, 4, 8, 12 | 0 | 00XXX |
| 1, 5, 9, 13 | 1 | 01XXX |
| 2, 6, 10, 14 | 2 | 10XXX |

TABLE 1-continued

| PHY Device Address | Group Number | Address [4:0] |
|---|---|---|
| 3, 7, 11, 15 | 3 | 11XXX |

Thus, the inventive multiplexed polling system is the status polling system to make four (4) physical boards into one group instead of the polling system according to the physical ports. In addition, the enabled port number is transmitted by using the user defined field UDF2 of the cell.

Figure 4:
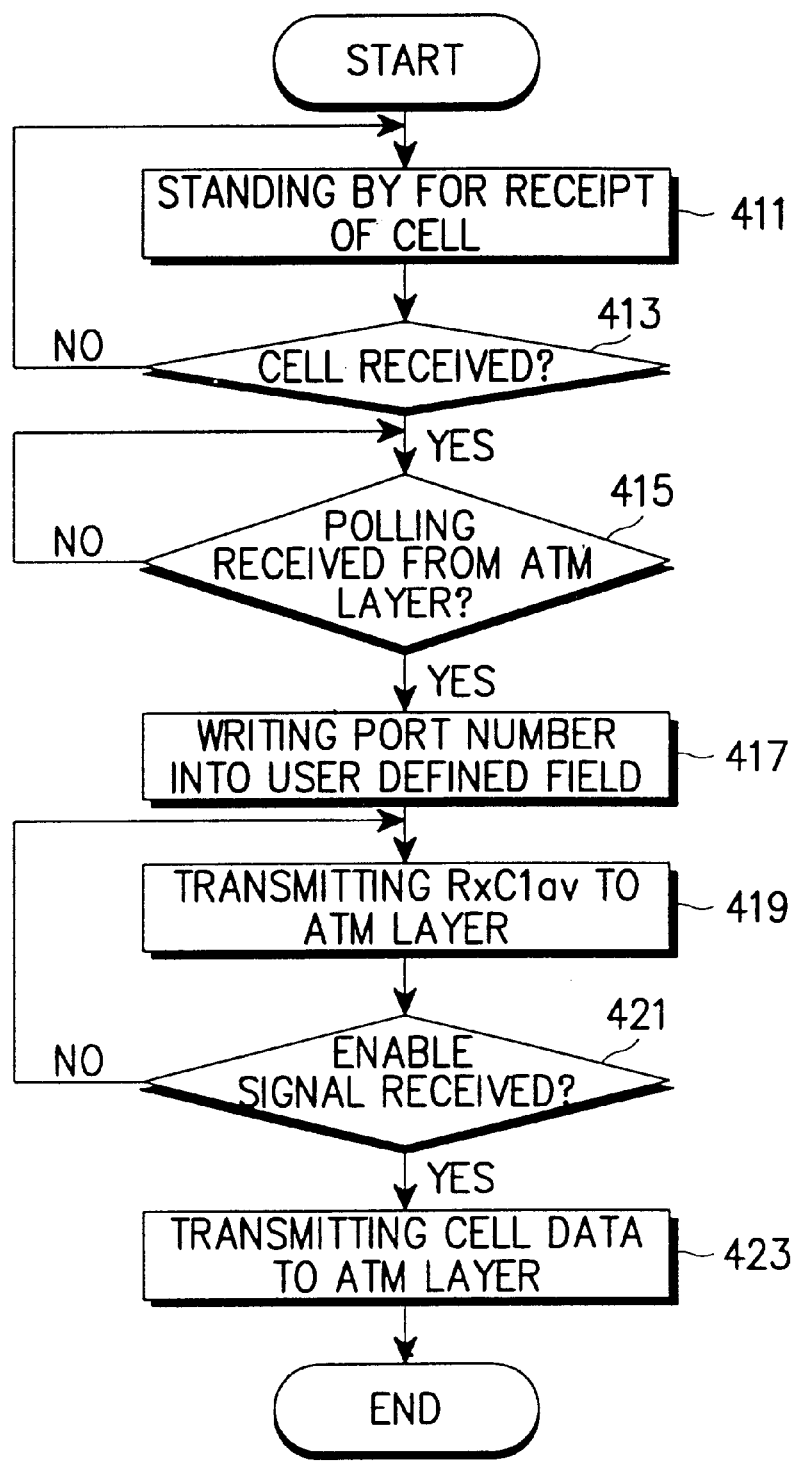
FIG. 4 is a flow chart for illustrating the steps of transmitting cells from the physical layer to the ATM layer according to the present invention.

Referring to FIG. 4, the procedure of transmitting cells from the physical layer to the ATM layer is described. In step 411 the physical layer stands by for receipt of a cell, and in step 413 the physical layer checks for receipt of a cell from the physical ports. When a cell is received, the procedure goes to step 415, or otherwise returns to step 411. Step 415 checks for receipt of polling from the ATM layer 311, which loads in sequence the address data of Table 1 on the data line 313. When step 415 determines that polling is received, the procedure goes to step 417, or otherwise returns to, or remains in, step 415. Step 417 writes the port number of the physical port, through which the cell is received, into the user defined field UDF2 of the cell. In step 419 a state signal receiving Clav signal RxClav is transmitted to the ATM layer 311. Then, step 421 checks for receipt of an enable signal from the ATM layer 311. When step 421 determines the enable signal is received, the procedure goes to step 423, or otherwise returns to step 419. In step 423, the physical layer 312 transmits the received cell through the data line 313 to the ATM layer 311.

Figure 5:
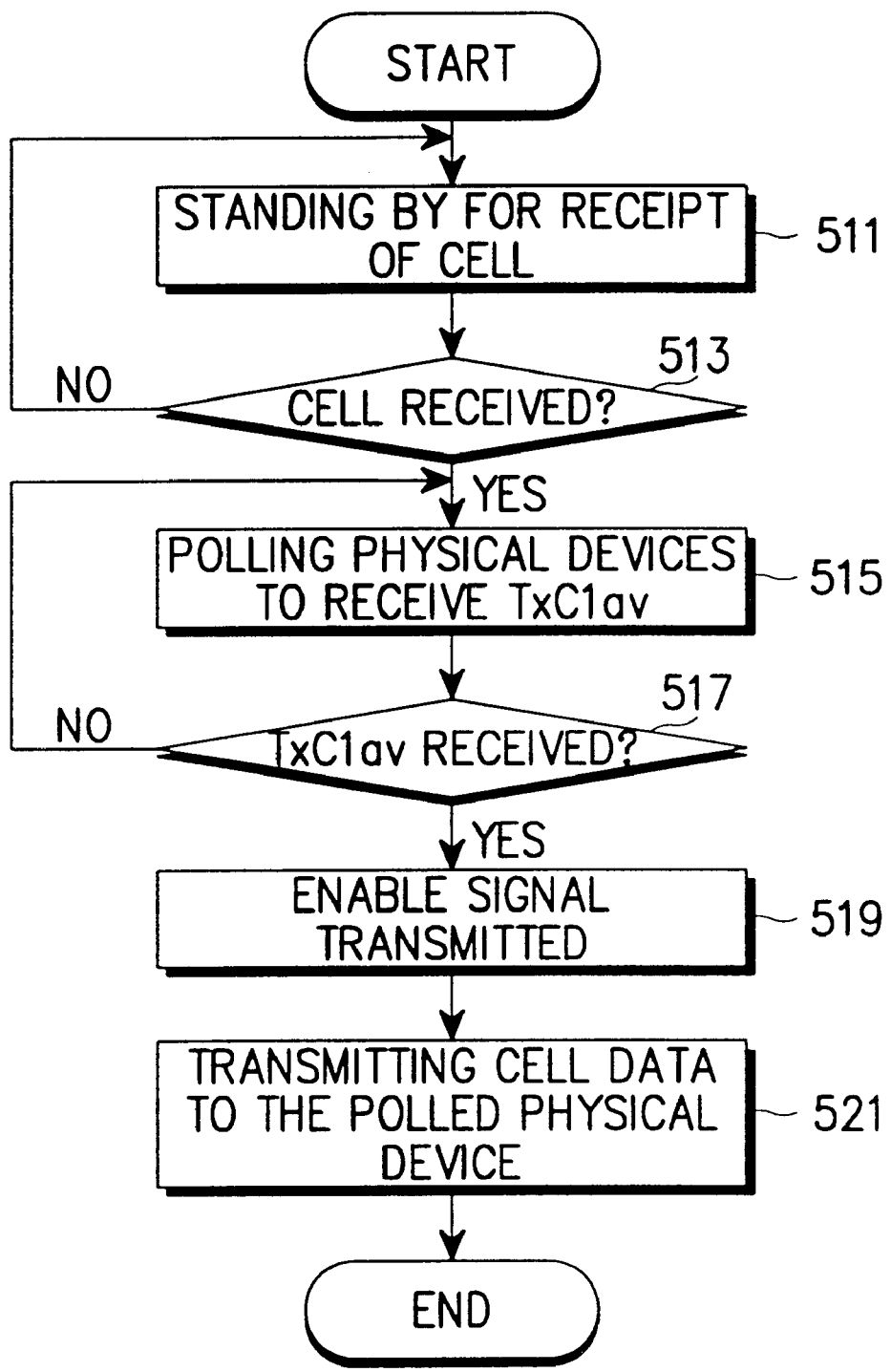
FIG. 5 is a flow chart for illustrating the steps of transmitting cells from the ATM layer to the physical layer according to the present invention

On the contrary, the procedure of transmitting cells from the ATM layer 311 to the physical layer 312 is described with reference to FIG. 5. In step 511 the ATM layer 311 stands by for receipt of a cell from AAL layer, and in step 513 check for receipt of a cell from the AAL layer. When it is determined that a cell is received in step 513, the procedure goes to step 515, or otherwise returns to step 511. In step 515, the ATM layer 311 multiplexly polls the physical devices of the physical layer 312 in groups to receive a state signal transmitting Clav signal TxClav. Then, step 517 checks for receipt of the state signal transmitting Clav signal TxClav. In order to accomplish such polling operation, the ATM layer 311 loads, in sequence, the address data of Table 1 on the data line 313. When step 517 determines that the transmitting Clav signal TxClav is received, the procedure goes to step 519, or otherwise returns to step 515. In step 519, upon receipt of the transmitting Clav signal TxClav, the ATM layer 311 transmits an enable signal to the physical device through which the Clav signal TxClav is received. Then, step 521 transmits the received cell data to the polled physical device, which in turn checks the user defined field UDF2 of the received cell to transmit the cell through the physical port written therein.

In conclusion, the inventive concept may be summarized in the following two points. Firstly, the multiplexed polling system of the UTOPIA level 2 proposed by the ATM forum is used to reduce the conventional cell format with an additional dummy header of 3 bytes to the standard cell format. Secondly, such multiplexed polling system is modified to accommodate more physical ports. For example, if the multiplexed polling system proposed by the ATM forum is applied without the inventive modification, each ATM layer may support only 31 physical ports. However, the inventive modification makes it possible to accommodate more than 61 physical ports.

While the present invention has been described with specific embodiments accompanied by the attached drawings, it will be appreciated by those skilled in the art that various changes and modifications may be made thereto without departing the gist of the present invention.

What is claimed is:

1. An apparatus for transmitting cells between an ATM (Asynchronous Transfer Mode) layer and a physical layer according to ATM protocol, comprising:

a port number region, included in each of said cells, for storing a port number of said physical layer, wherein said port number region is a user defined field of an ATM cell format;

a specified number of uniform physical device groups obtained by uniformly dividing said physical layer into a plurality of device groups comprising a predetermined number of physical devices;

a first cell available signal line connected between said ATM layer and a first one of said uniform physical device groups;

a second cell available signal line connected between said ATM layer and a second one of said uniform physical device groups;

a third cell available signal line connected between said ATM layer and a third one of said uniform physical device groups;

a fourth cell available signal line connected between said ATM layer and a fourth one of said uniform physical device groups; and a data line connected between said ATM layer and each of said physical devices of each of said physical device groups, wherein said ATM layer multiplexly polls said physical device groups through said data line.

2. An apparatus as defined in claim 1, wherein said ATM layer multiplexly polls said physical device groups through transmission of a sequence of addresses through said data line characterized in that the two most significant bits of said addresses determine which of said physical device groups is polled.

3. An apparatus for transmitting cells between an ATM layer and a physical layer according to ATM protocol, comprising:

a port number region, included in each of said cells, for storing a port number of said physical layer, wherein said port number region is a user defined field of an ATM cell format;

a specified number of uniform physical device groups obtained by uniformly dividing said physical layer into a plurality of device groups comprising a predetermined number of physical devices;

a first cell available signal line connected between said ATM layer and a first one of said uniform physical device groups;

a second cell available signal line connected between said ATM layer and a second one of said uniform physical device groups;

a third cell available signal line connected between said ATM layer and a third one of said uniform physical device groups;

a fourth cell available signal line connected between said ATM layer and a fourth one of said uniform physical device groups; and a data line connected between said ATM layer and each of said physical devices of each of said physical device groups, wherein said physical layer writes said port number into each of said cells transmitted to said ATM layer upon receipt of polling from said ATM, and said ATM layer multiplexly polls said physical device groups to transmit cells to polled physical devices.

4. In an ATM switching system including a physical layer divided into a specified number of uniform physical device groups multiplexly polled by an ATM layer, a method of transmitting a cell from the physical layer to the ATM layer, comprising the steps of:

checking the multiplexed polling of said ATM layer by said physical layer;

writing a physical port number into a port number region included in said cell with transmitting a state signal to said ATM layer upon receipt of said multiplexed polling, wherein the port number region of said cell is a user defined field of an ATM cell format; and transmitting said cell to said ATM layer upon receipt of an enable signal from said ATM layer.

5. In an ATM switching system including a physical layer divided into a specified number of uniform physical device group multiplexly polled by an ATM layer, a method of transmitting a cell from the ATM layer to the physical layer, comprising the steps of:

multiplexly polling said physical device groups by said ATM layer;

transmitting an enable signal to the polled device upon receipt of a state signal from said physical layer; and transmitting said cell to said physical layer.

6. In an ATM switching system including a physical layer divided into a specified number of uniform physical device groups multiplexly polled by an ATM layer, a method of transmitting a cell between the ATM layer and the physical layer, comprising the steps of:

multiplexly polling said physical device groups by said ATM layer;

transmitting an enable signal to the polled device upon receipt of a state signal from said physical layer;

transmitting said cell to said physical layer;

checking the multiplexed polling of said ATM layer by said physical layer;

writing a physical port number into a port number region included in said cell with transmitting a state signal to said ATM layer upon receipt of said multiplexed polling, wherein the port number region of said cell is a user defined field of an ATM cell format; and transmitting said cell to said ATM layer upon receipt of an enable signal from said ATM layer.

* * * * *